Sept. 27, 1932. W. HARRIGAN 1,879,221
LUBRICATING APPARATUS
Filed April 1, 1930 2 Sheets-Sheet 1

Sept. 27, 1932.  W. HARRIGAN  1,879,221
LUBRICATING APPARATUS
Filed April 1, 1930   2 Sheets-Sheet 2

Inventor
William Harrigan
By his Attorney
R. J. Dearborn

Patented Sept. 27, 1932

1,879,221

UNITED STATES PATENT OFFICE

WILLIAM HARRIGAN, OF JERSEY CITY, NEW JERSEY, ASSIGNOR TO THE TEXAS COMPANY, OF NEW YORK, N. Y., A CORPORATION OF DELAWARE

LUBRICATING APPARATUS

Application filed April 1, 1930. Serial No. 440,684.

This invention relates generally to lubricating apparatus and in a more specific aspect to what may be termed a multi-stage grease gun for supplying lubricants to bearings under controllable pressures.

One object of my invention is to provide an apparatus for dispensing heavy or extremely viscous lubricants.

Another object of my invention is to provide an apparatus which will operate independently of any fluid pressure supply to supply lubricants to bearings.

A further object of my invention is to provide means in a grease dispensing apparatus for insuring a continuous and uniform flow of the lubricant to the pumping stage as long as any lubricant remains in the storage or supply chamber.

Still another object of my invention is to provide a conditioning chamber in which the lubricant to be dispensed is brought to a uniform temperature and consistency prior to its delivery to the pumping stage.

Other objects, features, and advantages of the invention will appear as the description thereof progresses, reference being had to the accompanying drawings in which, Figure 1 is a view in side elevation and largely in section, of a grease dispensing apparatus embodying my invention.

Figure 1:
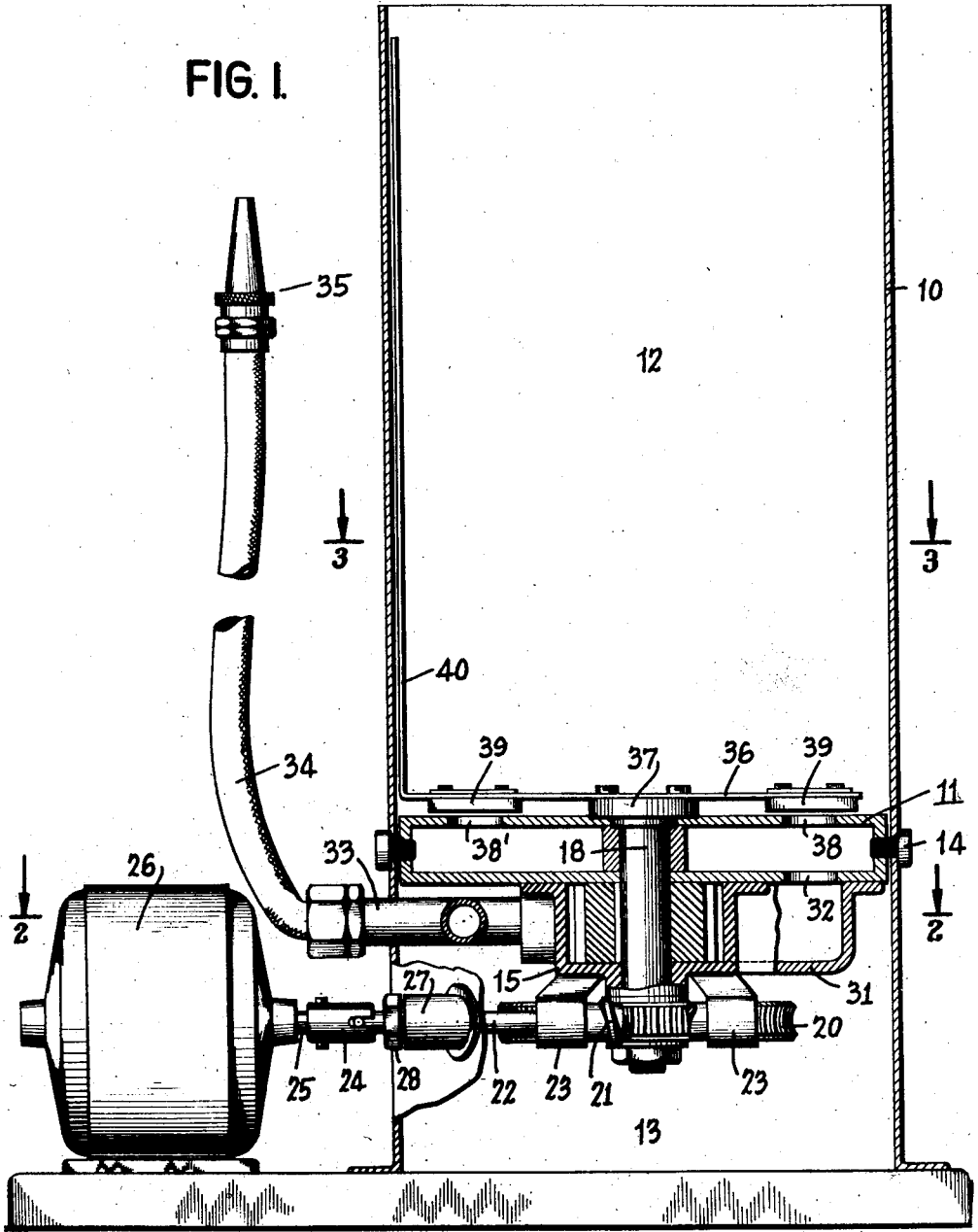
Figure 2:
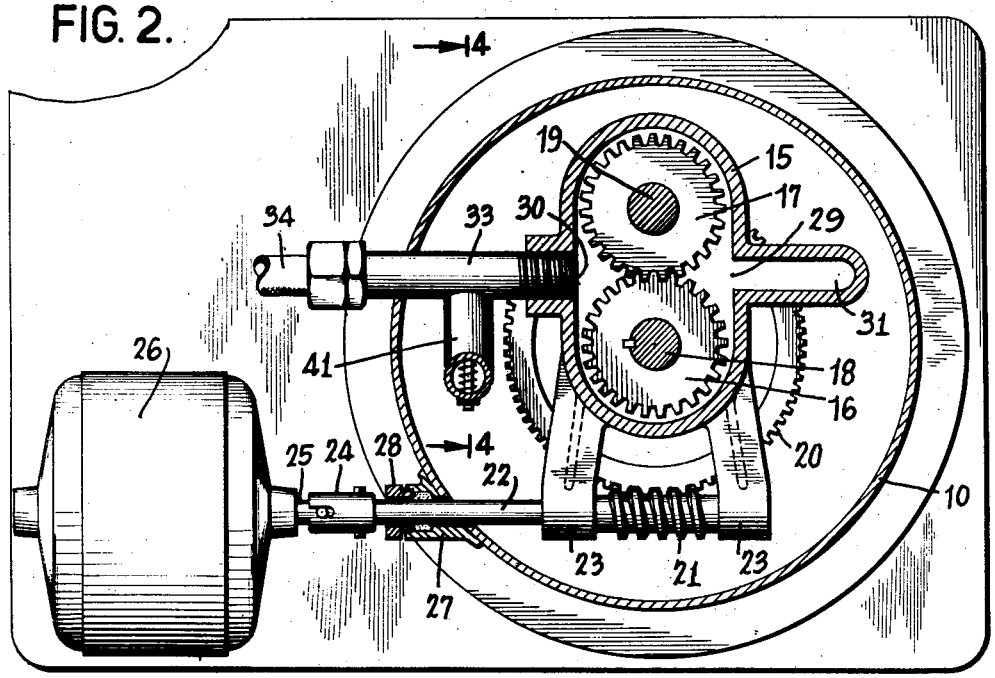
Figure 2 is a sectional plan view taken on the line 2—2 of Figure 1.
Figure 3:
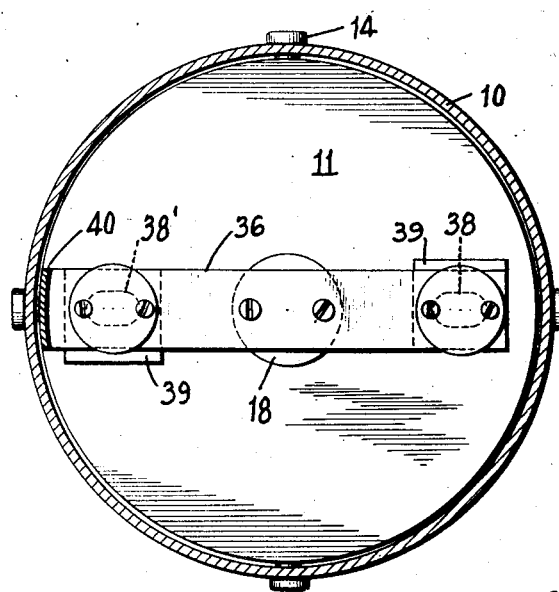
Figure 3 is a sectional plan view taken on the line 3—3 of Figure 1.
Figure 4:
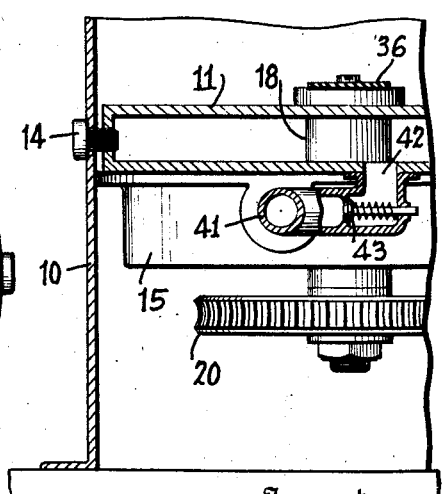
Figure 4 is a view in sectional elevation of a portion of the apparatus, the view being taken on the line 4—4 of Figure 2.

Referring to the drawings, it will be seen that the apparatus comprises a cylinder 10 which is divided intermediate its ends by a readily removable and independent chambered member or housing 11. That portion of the cylinder above member 11 constitutes a chamber for the storage of the lubricant while the portion below the housing contains or encloses certain of the pumping mechanism, presently to be described.

The chambered member 11 is interiorly unobstructed and is formed with a flat top and bottom and is of slightly smaller diameter than the inside diameter of the cylinder 10, so that there may be a narrow space between its periphery and the inner wall of the cylinder 10. Set screws 14 extending through threaded openings in the walls of the cylinder 10 and the chambered member 11 maintain the latter in stationary position.

Attached to, or if desired, formed integrally with the underside of the chambered member 11, is a pump housing 15 which is adapted to contain co-operating gear wheels 16 and 17. One of the gears 16 is keyed upon an intermediate portion of a bolt 18 which constitutes an operating shaft, while the second gear 17 is mounted upon an idler shaft 19. Housing 15 is so formed that its inner walls are spaced only slightly from the peripheries of the two gears. One end of shaft 18 extends downwardly through the bottom of housing 15 and a worm wheel 20 is mounted upon its lower end. Wheel 20 meshes with a worm gear 21 formed upon a horizontally disposed shaft 22 and any movement of gear 21 is imparted directly to the wheel 20 and thereby to shaft 18. Shaft 22 is journalled in spaced bearing members 23 and 23' which may either be formed integral with or secured to the lower portion of housing 15, and one end of shaft 22 extends through the wall of cylinder 10 and is coupled as at 24 to the end of cylinder 10 and is coupled as at 24 to the end of the rotary shaft 25 of an electric motor 26, or to any other suitable driving mechanism. A stuffing box 27 having a packing gland 28 is provided for preventing the leakage of grease through the opening in the wall of cylinder 10 through which shaft 22 extends.

The pump or gear housing 15 is formed with oppositely disposed ports 29 and 30. Port 29 constitutes a grease inlet and communicates with the interior of chambered member 11 through a conduit or intermediate chamber 31 and a port or opening 32 in the base of chambered member 11. Port 30 constitutes a grease discharge outlet to which is connected one end of a pipe 33 of sufficient length to extend through the wall of cylinder 10. A flexible hose 34, or a delivery pipe of any desired type or kind, may be connected to the outer end of pipe 33 and the hose may be provided with any suitable nozzle or coupling such as that indicated generally by the numeral 35.

A cross bar 36 is secured intermediate its ends to the head 37 of bolt 18 the upper end of which extends through chambered member 11. The bar extends across the greater part of the flat top of chambered member 11 which is formed with oppositely disposed ports or openings 38 and 38'. Screens (not shown) may be secured in openings 38 and 38' to prevent the entry of any solid material or foreign matter into member 11. Forwardly inclined scraper blades 39 are secured near the outer extremities of bar 36 and so positioned that during the rotation of shaft 18 and bar 36 the blades sweep over the openings 38 and 38' simultaneously and force the grease contained in the conditioning chamber 11 through the openings and thence through port 32 and conduit 31 into the pump housing. A vertically disposed cutting blade 40 is secured to or formed integrally with one end of the cross bar 36 and as the cross bar rotates within the cylinder the blade 40 scrapes or frees the grease from the side wall of the cylinder so that it may either gravitate through the openings 38 and 38' or be forced therethrough by the action of the blades 39.

The pressure in hose 34 is controlled by means of a valved by-pass line or pipe 41 which connects at one end with the pipe 33 and at the other end with the interior of the chambered member 11 through an opening 42 in the base of that member. A spring controlled checked valve 43 is disposed in by-pass line 41 and opens only when the pressure in hose 34 becomes excessive by reason of the closure of the valve (not shown) in nozzle 35. When check valve 43 is opened by reason of the excessive pressure in the line any grease in the by-pass line is returned directly to chambered member 11.

Chambered member 11 provides a relatively small zone in which the grease from the storage chamber above is to some extent conditioned before delivery to the pump proper. After having been considerably agitated by the scraper and cutting blades within the cylinder 10, the grease passes through the conditioning chamber in which there are no obstructions and away from swirl of the larger body of grease in the storage chamber. In this zone the grease is brought to a substantially uniform consistency and generally to a higher temperature by reason of the frictional heat generated by the pump and transmitted to member 11 by conduction, and in this improved condition the grease finally passes to the pump in a uniform flow.

Apparatus of preferred form and construction has been illustrated and described for the purpose of showing a way in which this invention may be practiced, but the inventive thought upon which this application is based is broader than the illustrative embodiment thereof, and no limitations are intended other than those imposed by the appended claims.

I claim:

1. In grease dispensing apparatus, the combination of a vertically disposed cylindrical housing, an independent chambered member having openings in its top and bottom walls removably secured intermediate the ends of the cylinder for dividing said cylinder into an upper compartment for the storage of grease and a lower compartment for housing the pumping mechanism, grease pumping mechanism in said lower compartment, and means in said upper compartment for forcing grease through said chambered member to said pumping mechanism, and means for operating said pumping and forcing means.

2. In grease dispensing apparatus, the combination of a cylindrical member, an independent chambered member having openings in its top and bottom walls adapted to fit within the cylindrical member, means for removably securing said chambered member intermediate the ends of the cylindrical member to form above the chambered member an upper chamber for the storage of grease and below a chamber for housing a pump, a pump in said lower chamber for discharging grease under pressure, means for forcing grease from the storage chamber through the chambered member to the pump, and means for operating said pump and grease forcing means.

In witness whereof I have hereunto set my hand and seal this 21st day of March, 1930.

WILLIAM HARRIGAN.